United States Patent [19]

Lübbers et al.

[11] 4,332,439

[45] Jun. 1, 1982

[54] METHOD OF PRODUCING A LIGHT CONDUCTOR

[75] Inventors: Dietrich W. Lübbers, Dortmund; Friedbert Hannebauer, Bochum, both of Fed. Rep. of Germany

[73] Assignee: Max Planck Gesellschaft zur Förderung der Wissenschaften e.V., Goettingen, Fed. Rep. of Germany

[21] Appl. No.: 60,846

[22] Filed: Jul. 26, 1979

[30] Foreign Application Priority Data

Jul. 27, 1978 [DE] Fed. Rep. of Germany ....... 2832880

[51] Int. Cl.³ .......................... G02B 5/14; G02B 5/17
[52] U.S. Cl. .................. 350/320; 350/96.25; 350/96.10
[58] Field of Search ............... 350/96.10, 96.24, 96.25, 350/320

[56] References Cited

U.S. PATENT DOCUMENTS

| 3,585,705 | 6/1971 | Allan | 350/96.10 |
| 3,854,792 | 12/1974 | Koelle | 350/96.24 |
| 4,039,250 | 8/1977 | Gaertner | 350/96.24 |
| 4,185,888 | 1/1980 | Quelle | 350/96.25 |

OTHER PUBLICATIONS

Midland et al., Cathode Ray Tube Typewriter, IBM Disclosure Bulletin, Feb. 1969.

*Primary Examiner*—John K. Corbin
*Assistant Examiner*—Rodney Bovernick
*Attorney, Agent, or Firm*—Michael J. Striker

[57] ABSTRACT

A light conductor wherein one of its opposite ends is divided in a plurality of separated strands, each of which is coordinated with a specific one of a plurality of regions at the other end arranged in any desired pattern and a method for producing such a light conductor.

3 Claims, 9 Drawing Figures

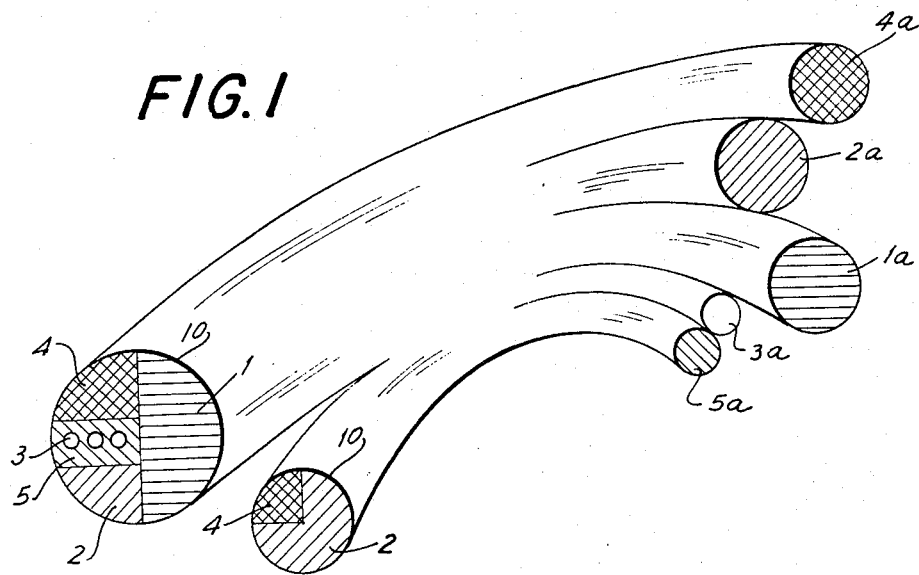
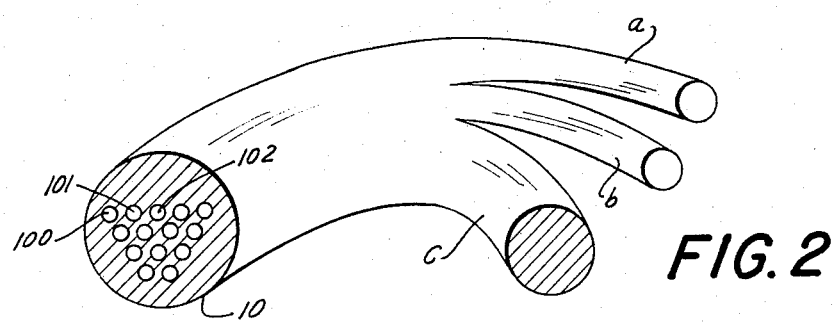
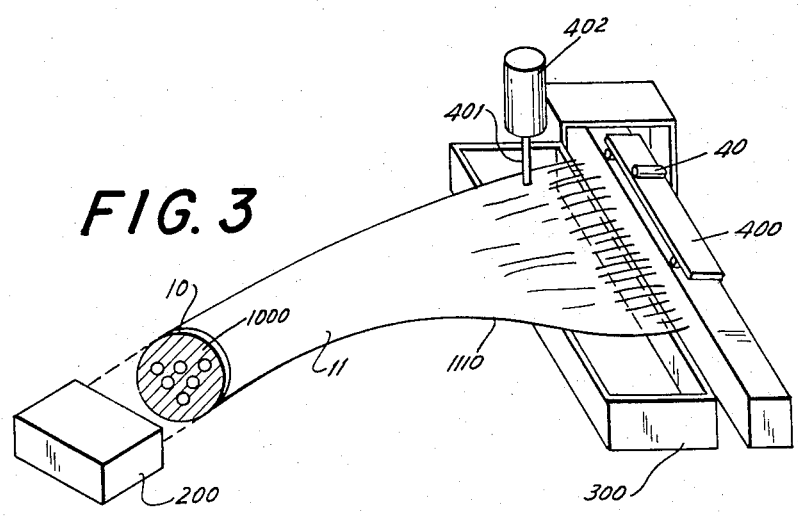

METHOD OF PRODUCING A LIGHT CONDUCTOR

BACKGROUND OF THE INVENTION

The present invention relates to a light conductor in which at least one of the ends thereof is divided into a plurality of individual strands.

It is known to use light conductors for the purpose to adapt light sources of predetermined geometrical construction to light receivers of different geometrical construction in such a manner that the outer boundary of the two ends of the light conductor are constructed in such a manner that they correspond respectively to the geometrical shape of the light source and the receiver. This is possible in that the individual fibers of the light conductor are arranged substantially randomly adjacent each other and be subsequently connected to each other in such a manner so that the connected ends may be adapted to the geometric form of light source and light receiver, respectively.

This known type of light conductor is, however, not suitable to solve the problem which arises when certain regions of an object are illuminated by discrete light sources or if certain regions are illuminated by a light source and the reflective light has to be returned to a receiver.

SUMMARY OF THE INVENTION

It is an object of the present invention to provide a light conductor which solves the above-mentioned problem.

With this and other objects in view, which will become apparent as the description proceeds, the light conductor of the present invention has opposite ends and at least one of the opposite ends is divided into a plurality of strands and wherein each strand of the one end is coordinated with a specific but randomly arranged region of the other end.

The advantage of this light conductor according to the present invention is that each area at the other end may perform a function independent from the other area.

This is especially of importance if the other end face of the light conductor is subdivided into a plurality of different elementary areas and wherein each strand of the one end is coordinated with a specific area of the other end.

In this way it is, for instance, possible to produce with certain fibers of the light conductors a finely distributed light pattern onto an object and to guide the reflected rays through other adjacent fibers to a receiver. In this way an optimal use of receiver, light source and reflective characteristics of the objects is possible.

Especially advantageous is if the elementary areas are combined into closed regions when a predetermined pattern on the surface of the object is illuminated and reflections thereof are to be measured. The total light emanating from the light source illuminates then only the predetermined pattern and the total reflected light may be returned through the other remaining fibers.

According to a further development of the present invention the elementary areas form lines. In this way it is possible to form outlines of a fineness up to the resolution of the light conductor, that is of a fineness which may reach up to the diameter of the individual fibers from which the light conductor is composed.

The other end of the light conductor may be subdivided into only two different elementary areas with which predetermined geometric outlines of the object may be illuminated and the reflection of these outlines may be measured. The two different areas may have a random distribution, or one of the elementary areas may be distributed according to a specific function. Thereby it is for instance possible to compensate for a certain brightness distribution of the light source.

The two different elementary areas may be formed from fibers of different materials, for instance glass fibers and quartz fibers, in which the glass fibers are used for guiding the light from the light source to the receiver and the quartz fibers for the return guiding of the light so that the filter action of the respective material may be used.

Finally, it is also possible to form the different areas from fibers of different diameters so that a filtering due to the spatial structure is possible.

It may also be of advantage when the two different areas are arranged in a repeating pattern since thereby an optimal relationship of guiding the light in the one and the opposite direction to and from a predetermined object may be obtained.

The present invention relates also to a method for producing a light conductor according to the present invention. The method according to the present invention comprises the steps of placing a mask onto the other end of the light conductor, having first specific but at random arranged areas which are translucent, whereas the remaining area of the mask is opaque, illuminating the mask covered end with at least one illuminating device, separating the light carrying fibers from the non-light carrying fibers at the one end, and connecting the light carrying fibers, respectively the non-light carrying fibers, into separate strands.

The advantages of the method according to the present invention consist that, for instance by photographically produced masks, very fine regions and contours may be produced and such masks are connected over the other end of the light conductor and the separation of the respective light carrying fibers may be carried out either by hand or by means of a photoelectric cell controlled device.

According to a further development of the method of the present invention the mask at the other end of the light conductor may be optically produced. This has the advantage that no separate masks may be produced for each desired pattern.

If especially exact masks are required then these masks may be formed by films extending over and fixedly connected to the other end of the light conductor.

In this case it is especially advantageous if the masks are produced by photoetching.

The mask covered end may be illuminated with a plurality of illuminating devices and the plurality of illuminating devices may be constructed, for respectively emanating light of different color, whereby it is possible to use different color sensitive receivers to thereby automate the separation of the fibers.

Another possibility exists in that one or a plurality of illuminating devices are provided from which a light ray of substantially punctiform cross-section emanates with which the end face of the other light conductor end may be scanned in a programmed manner. With this method it is possible to separate fibers arranged in a very complicated pattern from the other fibers. In this method it is advantageous if the cross-section of the illuminating light ray is variable.

In an arrangement in which the other end of the light conductor has a relatively large end face the illuminating device may be constituted by the screen of a cathode ray tube in which the light points on the screen may be electronically controlled in a known manner.

An especially simple arrangement according to the method of the present invention is derived when the illuminating device comprises an array of individual light sources.

Since the light conductor according to the present invention usually consists of a great number of individual fibers, it is important that the separation of the fibers is automatically performed.

The separation of the fibers into light carrying fibers and non-light carrying fibers may comprise the step of automatically displacing the light carrying fibers and the non-light carrying fibers with respect to each other and such displacement may be carried out by a photoelectronic controlled punch or by photoelectronic controlled gas impulses in which the gas impulse may be a suction or a pressure impulse. Another method of separating the light carrying fibers from the non-light carrying fibers comprises the steps of securing all fibers at the one end by a lightsensitive lacquer to a support, illuminating the lacquer by the light carrying fibers and releasing the light carrying fibers from the support by etching. In this way a subsequent hand-sorting of the fibers is greatly simplified.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 schematically illustrates a light conductor according to the present invention in which separate strands at one end of the light conductor are coordinated with a specific but randomly arranged regions of the other end of the light conductor;

FIG. 2 schematically illustrates a light conductor according to the present invention wherein the other end of the light conductor is subdivided into a plurality of different elementary areas and wherein each strand of the one end is coordinated with a specific area of the other end;

FIG. 3 schematically illustrates a method for producing a light conductor according to the present invention;

DESCRIPTION OF THE PREFERRED EMBODIMENTS

Figure 4A:
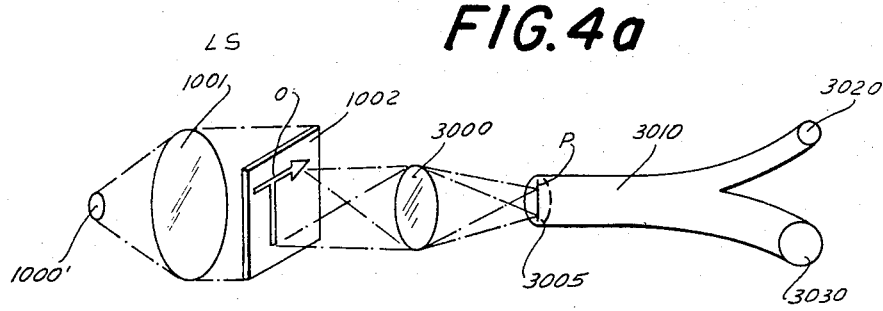
FIGS. 4a–4d illustrate respectively methods according to the present invention for producing at the other end of the light conductor an illuminated area of a specific pattern.

Referring now to the drawing and more specifically to FIG. 1 of the same in which a light conductor according to the present invention is schematically illustrated, it will be seen that this light conductor is divided at its one end, shown in the drawing as the right end, into a plurality of individual strands 1a, 2a, 3a, 4a and 5a, whereas the other end face 10 of the light conductor is divided in a plurality of specific, but randomly arranged regions 1, 2, 3, 4 and 5, as indicated by the different cross-hatching of these regions and in which each of the strands at the one end is coordinated with a specific region of the other end. Due to this arrangement it is possible to connect the sections or partial end faces 1–5 with different optical elements, as for instance receivers or emitters, whereby the geometrical shape of the surface portions 1–5 is adapted to the geometrical form of these optical elements, whereas the shape of the end faces 1a–5a is determined by corresponding forming and subsequent connecting, for instance by cementing the fibers forming the strands so as to be adapted to be connected to other optical elements.

FIG. 2 schematically illustrates another embodiment of a light conductor according to the present invention in which the end face 10 is provided with two different elementary areas in which the small areas 100, 101, 102, etc., are spatially periodically distributed. The fibers of the elementary areas 100, 101, 102, etc. are gathered together in two strands a and b, whereas the other fibers, that is those which surround the aforementioned elementary areas are connected together in an additional strand c. The arrangement constitutes therefore for the elementary areas 100, 101, 102, etc. a light ray divider, whereby the divider relationship between the two strands a and b is determined by the number of respective connected fibers and this arrangement may for instance be used in order to direct light over the strands a and b to a receiver which light has been directed over the strand c to a reflecting object. Object, receiver and light source are not shown in FIG. 2.

FIG. 3 schematically illustrates apparatus for manufacturing the light conductor shown in FIG. 2. As shown in FIG. 3 a mask 1000 is placed on the end 10 of the light conductor 11 which faces a light source 200. This mask 1000, which may be produced by a known photochemical process, is transparent at the areas corresponding to the elementary areas 100, 101, 102, etc. shown in FIG. 2, whereas the surrounding areas of the mask are opaque. The fibers 1,110 at the right end, as shown in FIG. 3, are not yet connected together, but are spread in a row and abut with the ends thereof on a frame 300. A carriage 400 is movable longitudinally of the frame 300 and carries a punch 401 movable in vertical direction and operated by a magnet 402. The magnet is controlled by a photocell 40 carried by the carriage 400 in a plane coinciding with the plane at which the unconnected ends of the fibers are arranged and facing the latter. If the mask 1000 is now illuminated by the light source 200, then only those fibers will carry light which are arranged behind the transparent surface portions of the mask 1000. The plunger 401 which is controlled by the photocell 40 will move downwardly whenever light through a light carrying fiber impinges on the photocell 40 to thereby displace the light carrying fiber downwardly into the trough-shaped frame 300, so that in this way the light carrying fibers which are located behind the transparent surface portions of the mask 1000 are separated from the other fibers.

Figure 5:
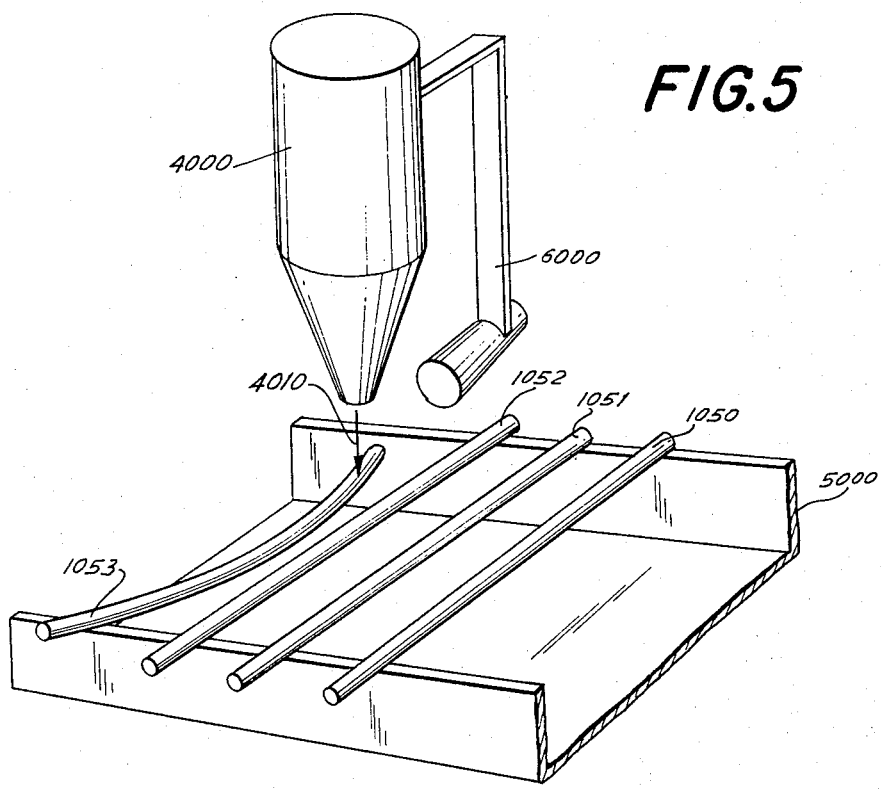
FIG. 5 schematically illustrates a method according to the present invention in which light carrying fibers are separated from non-light carrying fibers by gas impulses.

Instead of a mechanically operated punch or plunger it is also possible to use suction or pressure gas impulses produced by an air stream to separate the light carrying fibers from the non-light carrying fibers. Such an arrangement is schematically illustrated in FIG. 5, wherein the disconnected ends 1050, 1051, 1052 and 1053, etc. are again located on the side walls of a trough-shaped frame 5000. A fine nozzle 4000 supplied with air under pressure emits, when opened, a downwardly directed narrow air stream 4010 and opening and closing of the nozzle is controlled, in a manner known per se and not forming part of the present invention, by a photocell 6000 connected to the nozzle 4000 for movement therewith along a path parallel to the frame 5000 in the manner as described in connection with FIG. 3. If, for instance, the fiber 1053 is arranged behind a transparent portion of the mask in FIG. 5 such light will impinge on the photocell 6000 to open the nozzle so that the air stream 4010 emanating therefrom will displace the right end, as viewed in FIG. 5, of the fiber 1053 in downward direction. If any of the following fibers is located behind an opaque portion of the mask, the photocell 6000 will not be actuated and the right end of this fiber will remain on the side wall of the trough-shaped frame 5000. In this way the fibers are again separated in light carrying and non-light carrying fibers which may then be respectively connected to each other to form the strands a, b and c as shown in FIG. 2.

Figure 6:
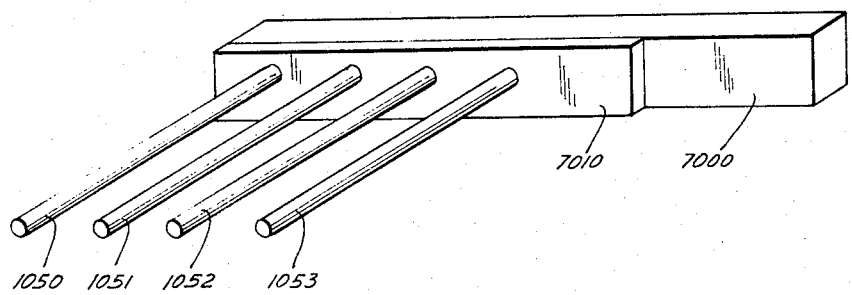
FIG. 6 schematically illustrates a further method according to the present invention for separating light carrying fibers from non-light carrying fibers.

Another way of separating the light carrying from the non-light carrying fibers is schematically illustrated in FIG. 6. As shown therein the plurality of unconnected fibers 1050, 1051, 1052, 1053, etc. are connected by a layer 7010 of a photosensitive lacquer on a support 7000 of transparent material. The connected left ends of the fibers, not shown in FIG. 6 are located, for instance, behind a mask 1000 as described in connection with FIG. 3 and are exposed to the light emanating from a light source, not shown in FIG. 6, so that some of the fibers will be light carrying fibers and the other will be non-light carrying fibers. After a short exposure to the light, the arrangement as shown in FIG. 6 is emerged into an etching solution. Thereby the layer 7010 is etched away around those fibers which have been light carrying fibers and these fibers are thus freed and may be separated from the others.

While FIG. 3 illustrated a mask 1000 with transparent and opaque portions connected to the left end of a light conductor according to the present invention, it is also possible to produce a mask or an equivalent thereof, that is an illuminated pattern, by optical means. Various modifications of such an arrangement are illustrated in FIGS. 4a–4d. As shown in FIG. 4a an illuminated arrangement LS including a substantially point-shaped light source 1000' and a lens 1001 transforming the light rays emanating from the light source 1000' into parallel light rays is arranged to one side of a mask 1002 provided with an opening or slits O of any desired outline so that the light rays will pass only through this opening O through an additional lens 3000, whereby a lightened area or pattern P corresponding to the opening or the slits O in the mask 1002 is produced on the end face 3005 of the light conductor 3010, so that the light carrying fibers may be separated from the non-light carrying fibers by any of the methods discussed above in connection with FIGS. 3, 5 and 6 and the light carrying fibers then be connected to a strand 3020 whereas the non-light carrying fibers may be connected to an additional strand 3030.

Figure 4B:
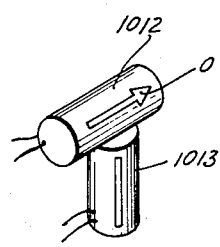

FIG. 4b illustrates another embodiment in which the illuminating arrangement LS including the light source 1000', the lens 1001 and the mask 1002 with the slit O therein is replaced by two light sources respectively arranged in cylindrical casings 1012 and 1013 arranged with respect to each other as shown in FIG. 4b and formed with respective slits O so that substantially the same image or illuminated pattern as is produced by the arrangement shown in FIG. 4a will be produced on the end face 3005 of the light conductor not shown in FIG. 4b.

Figure 4C:
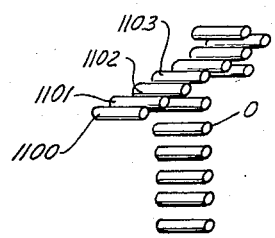

A further embodiment is schematically illustrated in FIG. 4c in which the illuminating arrangement includes a plurality of individual light sources 1100, 1101, 1102, 1103, etc. arranged in a specific array to produce for instance on the end face 3005, not shown in FIG. 4c an illuminated area in the form of a T permitting thereby again to separate the fibers into light carrying fibers and non-light carrying fibers by means of any of the methods illustrated in FIGS. 3, 5 and 6.

Figure 4D:
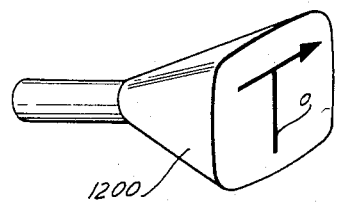

Finally, FIG. 4d illustrates an illuminating arrangement in form of a cathode ray tube on the screen of which an image O is produced by controlling the ray of the cathode tube, in a manner known per se, which again permits to separate the light carrying fibers from the non-light carrying fibers in the manner as discussed before.

While the various arrangements shown in FIGS. 4a–4d are made to produce a substantially T-shaped image on the end 3005 of the light conductor, it is evident that any other illuminated pattern may be produced thereon.

It is further mentioned that the light emanating from the light sources 1012 and 1013 shown in FIG. 4b or the individual light sources 1100, etc. as shown in FIG. 4c may be all of the same color or of different colors which would permit to separate the light carrying fibers, not automatically, but by hand into two different strands, as for instance shown in FIG. 2.

It will be understood that each of the elements described above, or two or more together, may also find a useful application in other types of light conductors and methods of making the same differing from the types described above.

While the invention has been illustrated and described as embodied in a light conductor and methods of making the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for the production of a light conductor having opposite ends and composed of a plurality of thin fibers, wherein at least one of said ends is divided into a plurality of strands and wherein each strand of said one end comprises fibers of a specific one of a plurality of regions at the other end arranged in any desired pattern, said method comprising the steps of producing at said other end an illuminated pattern of any desired outline so that some of the fibers will be light carrying fibers and the other non-light carrying fibers; displacing said light carrying fibers and said non-light carrying fibers with respect to each other by a photoelectric control rod punch; and connecting said light carrying fibers, respectively said non-light carrying fibers into said separate strands.

2. A method for the production of a light conductor having opposite ends and composed of a plurality of thin fibers, wherein at least one of said ends is divided in a plurality of strands, and wherein each strand of said one end comprises fibers of a specific one of a plurality of regions at the other end arranged in any desired pattern, said method comprising the steps of producing at said other end in illuminated pattern of any desired outline so that some of said fibers will be light carrying fibers and the other non-light carrying fibers; displacing said light carrying fibers and said non-light carrying fibers with respect to each other by gas impulses; and connecting said light carrying fibers, respectively said non-light carrying fibers into said separate strands.

3. A method for the production of a light conductor having opposite ends and composed of a plurality of thin fibers, wherein at least one of said ends is divided in a plurality of strands and wherein each strand of said one end comprises fibers of a specific one of a plurality of regions at the other end arranged in any desired pattern, said method comprising the steps of producing at said other end an illuminated pattern of any desired outline so that some of said fibers will be light carrying fibers and the other non-light carrying fibers; separating said light carrying fibers from said non-light carrying fibers by securing all fibers at said one end in a row by a light sensitive lacquer to a support, illuminating the lacquer by said light carrying fibers and releasing said light carrying fibers from said support by etching; and connecting said light carrying fibers, respectively said non-light carrying fibers into said separate strands.

* * * * *